F. MOSSBERG.

JEWELER'S TURK'S HEAD ROLL.

No. 11,344. Reissued June 13, 1893.

Witnesses:

E B Read

Charles Hannigan

Inventor:

Frank Mossberg

By Benj Arnold Atty

UNITED STATES PATENT OFFICE.

FRANK MOSSBERG, OF ATTLEBOROUGH, MASSACHUSETTS, ASSIGNOR TO THE MOSSBERG MANUFACTURING COMPANY, OF SAME PLACE.

JEWELER'S TURK'S-HEAD ROLL.

SPECIFICATION forming part of Reissued Letters Patent No. 11,344, dated June 13, 1893.

Original No. 484,108, dated October 11, 1892. Application for reissue filed May 17, 1893. Serial No. 474,611.

*To all whom it may concern:*

Be it known that I, FRANK MOSSBERG, of Attleborough, in the county of Bristol and State of Massachusetts, have invented certain new and useful Improvements in Jewelers' Turk's-Head Rolls; and I do hereby declare that the following is a full, clear, and exact description thereof, reference being had to the accompanying drawings, and to the letters of reference marked thereon, which form a part of this specification.

This invention relates to the class of rolling-machines used by jewelers for reducing bars of metal to different sizes. The machine is known specifically as a "turk's-head."

The object of the improvement is to produce a machine that can be used for rolling stock down in both directions, vertically and laterally, at one operation to different sizes with one set of rolls without changing any of them for other rolls of a different thickness, as it is necessary to do in the usual form of turk's-head.

It is fully illustrated in the accompanying drawings.

Figure 1:
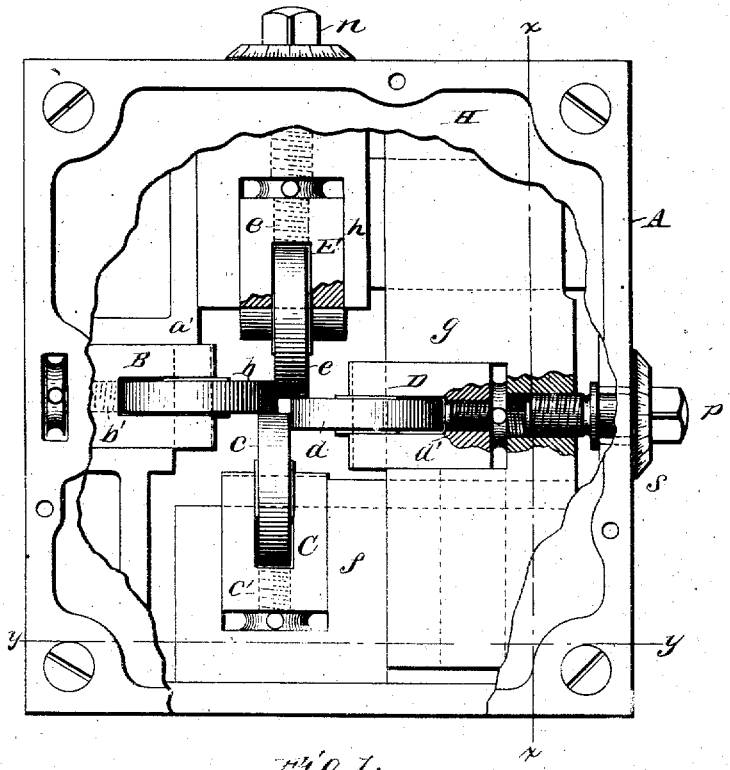
Figure 2:
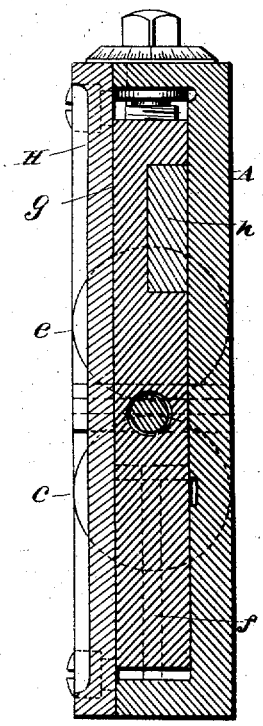
Figure 3:
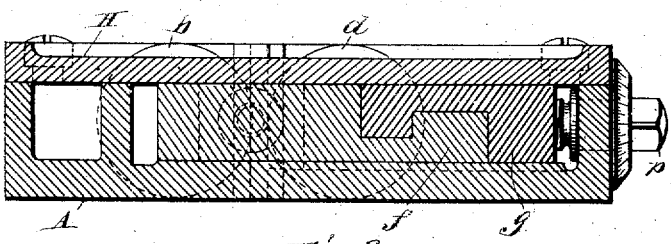
Figure 4:
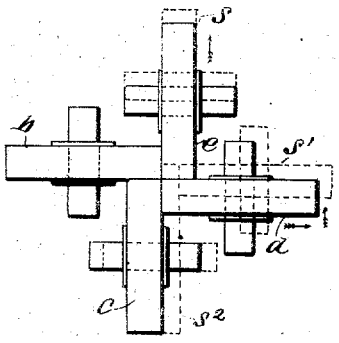
Figure 6:
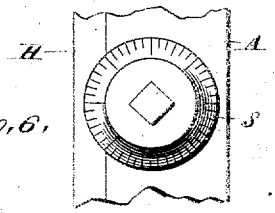
Figure 5:
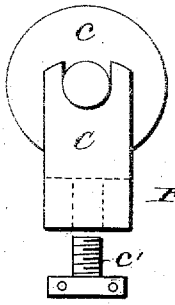

Figure 1 is a front elevation of the machine, the front plate being broken away to show the position of the rolls, &c. Fig. 2 is a vertical section taken on line $x\ x$ in Fig. 1, looking to the left. Fig. 3 is a horizontal section taken on line $y\ y$ in Fig. 1, looking upward. Fig. 4 is a diagram showing the relative positions of the rolls and their arbors. Fig. 5 shows a side elevation of a roll-carriage. Fig. 6 represents a face view of the head of one of the graduated setting-screws.

The case A is made in the shape of a vertical shallow box. The bottom or back and the sides are preferably made integral in one casting, with partitions to serve as guides for some of the carriages carrying the rolls. A cover H is secured on the front of the case by screws, and both cover and back have central apertures made through them. There are four carriages E B C D, all made alike in size and shape, carrying the four rolls $b\ c\ d\ e$, respectively, which are fast on arbors having open bearings in the sides of the carriages. (See Fig. 5, which is a side view of one of them.) Each of these carriages has a short screw $e'\ b'\ c'\ d'$, which screws are fitted to screw into the closed ends of the carriages, and have broad circular heads with holes in their peripheries to receive a bar-wrench to turn them by. These screws are for the purpose of adjusting the rolls to take up any reduction in size resulting from wearing or from grinding to true them off, and are not for use in setting the rolls for different sizes of bars.

Carriage B is held between one side of the partition $a'$ and a side of the partition $j$, and has no motion except a slight one toward the center of the case when adjusted for wear, &c.

Carriage E is held in a recess in the bar $h$, and has, besides the slight motion in that recess for adjustment by screw $e$, a motion with the bar in a direction to and from the center of the case controlled by the screw $n$. The bar $h$ is guided in its movements by one end resting against the partition $a'$ and the other end against the inside of the case A.

The carriage D is held in a recess in the bar $g$ and has the same arrangement of adjustment for wear as carriage E, and the bar $g$ has a recess in its upper end, in which the bar $h$ slides, (see Fig. 2) which connects the two bars together, so that when the bar $h$ is moved up or down the bar $g$ goes with it, though at the same time the bar $g$ and carriage D have a motion to and from the center controlled by the screw $p$.

Carriage C is held in a recess in the bar $f$ and has no movement toward the center, except for adjustment for wear by the screw $c'$; but it is connected by a double sliding clamp (see Fig. 3) to the bar $g$, so that when the latter bar is moved to or from the center the bar $f$ and carriage C move laterally with it.

It will be seen that the relative positions of the rolls are these: Roll $b$ has its periphery resting against one of the plain faces of the roll $e$, and roll $e$ has its periphery resting against one of the plane faces of the roll $d$, which roll has its periphery resting against one of the faces of roll $c$, the latter roll being in like position with regard to roll $b$, from which we started. Now if the roll $e$ is drawn up from the center of the screw $n$ its plane face will slide on the periphery of the roll $b$. At the same time the screw $n$, by drawing up the bar $h$ with roll $e$, will also, by its connection with bar $g$, draw up that bar and roll *d*, the periphery of which will slide on the face of the roll *c*. In this way the opening between the rolls will be lengthened vertically; but the rolls will still be in contact with each other. Then by drawing bar *g* from the center by the screw *p* the roll *d* will slide its plane face along the periphery of the roll *e*, and the bar *g*, will, by its connection with the bar *f*, move that bar and roll laterally and slide its periphery on the plane face of the roll *b*, which will enlarge the center opening laterally, still maintaining the contact of the rolls with each other. This is shown in Fig. 4, where the rolls have each one corner in the center and there is no opening; but by turning the screw *n* the roll *e* is raised to dotted line *s*, and the roll, *d*, being drawn out by its screw *p* and up by the connection of its bar *g* with the bar *h*, reaches the dotted lines *s'*, and the roll C, by the connection of its bar with the bar *f*, is moved to the dotted line $s^2$ and a square opening is formed in the center. It will be seen that the opening between the rolls can be made longest either vertically by using the screw *n*, or laterally by the screw *p*, or square by turning both equally, and that rectangular bars, square or oblong, can be rolled to any size not over that of the thickness of the rolls.

The setting-screws *n p* are alike in shape and size. They have collars on them inside the sides of the case to resist the thrust of the rolls and are fitted to screw into the bars *h* and *g* back of the carriages. The screw *n* passes through a round hole in the side of the case A; but the hole for the screw *p* in the side of the case is made oblong to allow the screw to rise with the bar *g*.

The turk's-head in use by jewelers is made with an upper and lower roll adjustable with regard to each other and two side rolls, also adjustable laterally, placed to run between the upper and lower rolls, the thickness vertically of the bar rolled being that of the side rolls, and for each different thickness a different pair of rolls must be provided, which makes it necessary to keep a large stock of rolls on hand with the trouble of exchanging them for different sizes. A turk's-head differs from jewelers' reducing rolls in having no mechanism for driving the rolls, as it is used like a draw-plate, the end of the bar to be reduced being made small enough to pass through the opening between the rolls and then drawn through by means of pinchers, as a wire is drawn through a draw-plate, the rolls being turned by contact with the bar.

Having thus described my improvement, I claim as my invention—

1. The combination of four rolls placed around a center, each roll having its periphery in contact with the plane face of the roll next to it, the first and second rolls having a connection between them, whereby when the first roll is moved the second roll will be moved in the same direction, and the second and third rolls having a connection between them, whereby the second roll being moved the third roll will be moved in the same direction with said connections, and means for moving the first and second rolls, substantially as specified.

2. The combination of the case A, carriages B, C, D and E, arranged to slide in ways in said case, rolls *b*, *c*, *d* and *e*, held in bearings in said carriages, adjusting screws *b'*, *c'*, *d'* and *e'* in the rear ends of said carriages, bars *h*, *g* and *f*, having sliding connections with each other, connecting carriages C, D and E, and screws *n* and *p* passing through the sides of the case and threaded into the bars *h g*, respectively, substantially as set forth.

3. The combination of the case A, carriages B, C, D and E, sliding in ways therein, rolls *b*, *c*, *d* and *e*, held in bearings in said carriages, screws *n* and *p*, passing through the sides of the case and threaded into bars *h g*, and bars *h*, *g* and *f*, arranged to slide in ways and connected together by sliding connections, substantially as set forth.

FRANK MOSSBERG.

Witnesses:

FRANK W. CARPENTER,
CARL CHRISTENSEN.